(12) United States Patent
Sasaki et al.

(10) Patent No.: US 9,240,593 B2
(45) Date of Patent: Jan. 19, 2016

(54) ACTIVE MATERIAL FOR NONAQUEOUS SECONDARY BATTERY AND METHOD FOR PRODUCING SAME

(75) Inventors: Reiko Sasaki, Ikoma-gun (JP); Akiyoshi Nemoto, Tsukuba (JP); Kenji Nakane, Tsukuba (JP); Yuichiro Imanari, Tsukuba (JP); Kensaku Horie, Tsukuba (JP); Hiroshi Inukai, Tsuchiura (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 1270 days.

(21) Appl. No.: 11/912,362

(22) PCT Filed: Apr. 21, 2006

(86) PCT No.: PCT/JP2006/308916
§ 371 (c)(1),
(2), (4) Date: Nov. 1, 2007

(87) PCT Pub. No.: WO2006/118227
PCT Pub. Date: Nov. 9, 2006

(65) Prior Publication Data
US 2009/0314984 A1    Dec. 24, 2009

(30) Foreign Application Priority Data

Apr. 28, 2005 (JP) ................................. 2005-131382

(51) Int. Cl.
| | |
|---|---|
| *H01M 4/88* | (2006.01) |
| *H01M 4/52* | (2010.01) |
| *H01M 4/36* | (2006.01) |
| *H01M 4/48* | (2010.01) |
| *C01G 51/00* | (2006.01) |
| *C01G 53/00* | (2006.01) |

(52) U.S. Cl.
CPC ............... *H01M 4/523* (2013.01); *C01G 51/42* (2013.01); *C01G 53/42* (2013.01); *C01G 53/50* (2013.01); *H01M 4/366* (2013.01); *H01M 4/483* (2013.01); *C01P 2002/52* (2013.01); *C01P 2002/54* (2013.01); *C01P 2006/12* (2013.01); *C01P 2006/40* (2013.01)

(58) Field of Classification Search
USPC ........ 429/120, 149, 176, 231.1, 231.3, 231.8, 429/223, 337, 330; 252/182.1
See application file for complete search history.

(56) References Cited

U.S. PATENT DOCUMENTS

| | | | |
|---|---|---|---|
| 6,372,385 B1 | 4/2002 | Kweon et al. | |
| 6,468,693 B1* | 10/2002 | Takami et al. | ................. 429/176 |
| 6,730,435 B1 | 5/2004 | Nakane et al. | |
| 7,608,365 B1* | 10/2009 | Kweon et al. | ............. 429/231.95 |
| 2002/0061436 A1* | 5/2002 | Inagaki et al. | ................. 429/120 |
| 2003/0162090 A1 | 8/2003 | Okada et al. | |
| 2004/0121234 A1 | 6/2004 | Le | |
| 2005/0079419 A1 | 4/2005 | Jan et al. | |
| 2005/0266316 A1 | 12/2005 | Kitao et al. | |

FOREIGN PATENT DOCUMENTS

| | | | |
|---|---|---|---|
| EP | 1 341 246 A2 | | 9/2003 |
| EP | 1341246 | * | 9/2003 |
| JP | 10-21913 A | | 1/1998 |
| JP | 11-167919 A | | 6/1999 |
| JP | 2000-48820 A | | 2/2000 |
| JP | 2001-28265 A | | 1/2001 |
| JP | 2001028265 | * | 1/2001 |
| JP | 2001-196063 A | | 7/2001 |
| JP | 2001196063 | * | 7/2001 |
| JP | 2002-151077 A | | 5/2002 |
| JP | 2002-348121 A | | 12/2002 |
| JP | 2003-109599 A | | 4/2003 |
| JP | 2003-257427 A | | 9/2003 |
| JP | 2005-78800 A | | 3/2005 |
| JP | 2005-340056 A | | 12/2005 |

* cited by examiner

*Primary Examiner* — Monique Peets
(74) *Attorney, Agent, or Firm* — Sughrue Mion, PLLC

(57) ABSTRACT

There is provided a method for producing an active material for a nonaqueous secondary battery, including firing an adherend in which a compound containing an element A (at least one element selected from among B, Al, Ga, In, Si, Ge, Sn, Mg and transition metal elements) is adhered to a particle surface of a material capable of being doped and dedoped with lithium ions, in a water-containing atmosphere so that weight increasing rate of the adherend is in a range of 0.1% by weight or more and 5.0% by weight or less, and firing the adherend.

14 Claims, No Drawings

ACTIVE MATERIAL FOR NONAQUEOUS SECONDARY BATTERY AND METHOD FOR PRODUCING SAME

TECHNICAL FIELD

The present invention relates to an active material for a nonaqueous secondary battery and a method for producing the same.

BACKGROUND ART

A nonaqueous secondary battery such as a lithium secondary battery has already been put to practical use as a source of electric energy for portable telephones, notebook computers and the like, and additionally has attempted to be applied in medium- and large-sized uses such as automobile use and electric power storage use.

A nonaqueous secondary battery has been demanded, which offers a small decrease in electric capacity in the case of repeating charge and discharge, that is, excellent cyclability. Also, a lithium secondary battery has large electric capacity though it is small in size, so that it has been demanded that safety in the case of exterior short circuit and interior short circuit be improved; a method for producing an active material has been demanded, which allows such a nonaqueous secondary battery excellent in cyclability and high in safety.

Then, a method for producing a positive electrode active material for a nonaqueous secondary battery has been proposed, such that the surface of lithium-containing complex oxide containing nickel is subject to a coating treatment with a compound having any of Mg, Si, Ti, Al, V, Co, K, Ca, Na and B (for example, Japanese Unexamined Patent Publication No. 2001-28265). However, a nonaqueous secondary battery produced by using the obtained positive electrode active material for a nonaqueous secondary battery is insufficient in cyclability as well as safety.

DISCLOSURE OF THE INVENTION

The present invention is intended to provide an active material for a nonaqueous secondary battery, which allows a nonaqueous secondary battery excellent in cyclability and safety, and a method for producing the active material, and additionally a nonaqueous secondary battery employing the active material.

Then, in order to solve the above-mentioned problem, through earnest studies on a method for producing an active material for a nonaqueous secondary battery, the inventors of the present invention have found that a compound of a specific metallic element is adhered to the particle surface of a material capable of being doped and dedoped with lithium ions to obtain an adherend, which is further retained in a water-containing atmosphere so as to increase in weight by a certain rate, and thereafter fired and thereby becomes an active material for a nonaqueous secondary battery, which allows a nonaqueous secondary battery excellent in cyclability and safety, to complete the present invention. That is to say, the present invention provides a method for producing an active material for a nonaqueous secondary battery, including retaining an adherend, in which a compound containing at least one element (element A) selected from among B, Al, Ga, In, Si, Ge, Sn, Mg and transition metal elements is adhered to the particle surface of a material capable of being doped and dedoped with lithium ions, under a water-containing atmosphere so that a weight increasing rate of the adherend is in a range of 0.1% by weight or more and 5.0% by weight or less, and firing the adherend.

Also, the present invention provides an active material for a nonaqueous secondary battery produced by firing an adherend, in which the compound containing the above-mentioned element A is adhered to the particle surface of a material capable of being doped and dedoped with lithium ions, wherein when the active material and an alkaline solution are mixed, a weight rate (W1) of the element A extracted from the active material to the alkaline solution is 3% or less with respect to a weight rate (W2) of the element A contained in the active material before being mixed.

Also, an active material for a nonaqueous secondary battery of the present invention can be used so appropriately as to allow a nonaqueous secondary battery excellent in safety and cyclability.

BEST MODE OF CARRYING OUT THE INVENTION

In a producing method of the present invention, a compound containing at least one element (element A) selected from among B, Al, Ga, In, Si, Ge, Sn, Mg and transition metal elements is adhered to the particle surface of a material (occasionally referred to as 'a core material' hereinafter) capable of being doped and dedoped with lithium ions.

The core material may be either of positive electrode and negative electrode active materials, but yet a positive electrode active material is preferable since effect by the present invention is great in the case of using the positive electrode active material. Examples of the positive electrode active material include lithium nickelate, lithium cobaltate and lithium manganate known as the positive electrode active material for a lithium secondary battery, and lithium nickelate is preferable since the charge and discharge capacity of a nonaqueous secondary battery obtained by using an active material of the present invention becomes higher.

Lithium nickelate contains a compound represented by a formula of a form such that a part of nickel is substituted with other elements, $Li_xNi_{1-y}M_yO_2$ (wherein, x and y are $0.9 \leq x \leq 1.2$ and $0 \leq y \leq 0.5$, respectively, and M is at least one metallic element selected from B, Al, Ga, In, Si, Ge, Sn, Mg and transition metal elements) as lithium nickel complex oxide. M in the formula is preferably at least one metallic element selected from B, Al, Mg, Co, Cr, Mn and Fe.

Examples of the core material in the present invention include a compound represented by a formula of a form such that a part of nickel is substituted with two or more other elements, $Li_xNi_{1-z}M_{2z}O_2$ (wherein, x and z are $0.9 \leq x \leq 1.2$ and $0.3 \leq z \leq 0.9$, respectively, and $M_2$ are at least two metallic elements selected from B, Al, Si, Sn, Mg, Mn, Fe and Co). For the purpose of improving cyclability and safety of a nonaqueous secondary battery, z is preferably a value in a range of 0.4 or more and 0.8 or less, more preferably a value in a range of 0.5 or more and 0.7 or less, and $M_2$ is preferably at least two elements selected from B, Al, Mn, Fe and Co, more preferably at least two elements selected from B, Mn, Fe and Co, far more preferably at least two elements selected from Mn, Fe and Co.

The element A adhered to the particle surface of this core material is at least one element selected from B, Al, Ga, In, Si, Ge, Sn, Mg and transition metal elements, preferably at least one selected from B, Al, Mg, Co, Cr, Mn and Fe, particularly preferably Al.

Examples of the compound containing the element A include oxide, hydroxide, oxyhydroxide, carbonate, nitrate, and an organic salt, of the element A or a mixture thereof. Above all, oxide, hydroxide, oxyhydroxide, carbonate of the element A or a mixture thereof are preferable.

The compound containing the element A used in the present invention is preferably fine particles as compared with particles of the core material due to coating the particle surface of the core material more efficiently; the BET specific surface area of the compound containing the element A is preferably five times or more as large as the BET specific surface area of particles of the core material, more preferably twenty times or more.

With regard to the amount of the compound containing the element A, the amount of the element A is preferably typically 0.005 to 0.15 parts by mole with respect to the core material, since an active material for allowing a nonaqueous secondary battery excellent in the balance among discharge capacity, cyclability and safety can be obtained; the amount of the element A is more preferably 0.02 to 0.10 parts by mole with respect to the core material.

A process for producing an adherend by adhering the compound containing the element A to the particle surface of the core material is preferably dry mixing industrially. A method of dry mixing is not particularly limited, and production of an adherend can simply be performed in such a method that the weighted amount of the core material and the compound containing the element A is put into a vessel and shaken, for example. The production thereof can also be performed by apparatuses typically used industrially, such as mixers of V type, W type and double cone type, powder mixer having a screw and stirring blade thereinside, ball mill and vibration mill.

Then, insufficient mixing occasionally brings a deterioration in cyclability and safety of a nonaqueous secondary battery produced by using the finally obtained active material, so that mixing is preferably performed to such a degree that an agglomerate of the compound containing the element A can not visually be confirmed. It is preferable that the addition of at least one mixing process using a medium to dry mixing processes allows favorable mixing efficiency and firm adhesion of the compound containing the element A to the particle surface of the core material to bring a tendency to become an active material for a nonaqueous secondary battery, which allows a nonaqueous secondary battery more excellent in cyclability and safety.

The adherend thus produced is retained in a water-containing atmosphere so that a weight increasing rate of the adherend is in a range of 0.1% by weight or more and 5.0% by weight or less to obtain an adhered retention material. The weight increasing rate in the above-mentioned range causes the obtained active material for a nonaqueous secondary battery to become an active material for a nonaqueous secondary battery, which allows a nonaqueous secondary battery excellent in cyclability and safety. The weight increasing rate of the adherend is preferably a range of 0.3% by weight or more and 3.0% by weight or less. A method of measuring the weight increasing rate is not particularly limited; for example, the empty weight of a vessel filled with the adherend is previously measured to fill the vessel with the adherend and measure the total weight thereof before and after retaining in a water-containing atmosphere, so that the weight increasing rate of the adherend can be calculated.

When the temperature in retaining the adherend in a water-containing atmosphere is in a range of 20° C. or more and 90° C. or less, and the relative humidity is in a range of 20% or more and 90% or less, it is preferable to bring a tendency to become an active material for a nonaqueous secondary battery, which allows a nonaqueous secondary battery more excellent in cyclability and safety, and to facilitate the control of the weight increasing rate thereof. The more preferable range is 30° C. or more and 70° C. or less, and a relative humidity of 50% or more and 80% or less.

Examples of a method of retaining the adherend in a water-containing atmosphere include a method of filling a vessel with the adherend to retain this tray in an atmosphere controlled in temperature and humidity.

While retaining the adherend, carbon dioxide gas is preferably supplied in view of the shortening of retention time. In particular, when the carbon dioxide gas amount in an atmosphere for retaining the adherend is set to 0.05 to 50 mg/h/(g-adherend), it is preferable since the time for achieving the weight increasing rate is shortened and the control of the weight increasing rate is comparatively facilitated. Then, with regard to a supply method of the carbon dioxide gas, gas containing the carbon dioxide gas may continuously be supplied into an atmosphere for retaining the adherend, or the carbon dioxide gas may be introduced into the atmosphere previously before retaining the adherend in the atmosphere. Examples of gas containing the carbon dioxide gas include pure carbon dioxide gas as well as gas in which carbon dioxide gas is diluted with air, nitrogen, oxygen or inert gas such as argon, and mixed gas thereof.

The carbon dioxide gas amount of more than 50 mg/h/(g-adherend) brings a tendency to shorten the time for reaching predetermined weight increase too much to control the weight increasing rate. It is a more preferable embodiment in the present invention that this carbon dioxide gas amount is 0.1 to 10 mg/h/(g-adherend).

In the producing method of the present invention, an active material for a nonaqueous secondary battery is produced by firing the adhered retention material obtained by retaining the adherend in a water-containing atmosphere as described above.

A firing temperature of 600° C. or more and a firing time of 30 minutes or more are preferable as firing conditions. In the case where the firing temperature is less than 600° C. or the firing time is less than 30 minutes, the element A adhered to particles of the core material tends to be not sufficiently adhered closely to the particle surface thereof. The firing temperature and time herein are maximum end-point temperature and retention time threat respectively in a temperature rise program, and yet in the case where a gap exists between program temperature and real temperature, the firing temperature is a temperature in terms of the real temperature.

Here, particles of the core material are preferably produced by processes including at least one-time firing, in which case the firing of the adhered retention material using the core material is not particularly limited under the conditions of the temperature and retention time that a crystal structure of particles of the core material is not destroyed. Then, it is preferable that either of temperature and retention time in the firing of the adhered retention material using the core material is in a range not exceeding temperature or retention time in the firing process of particle production of the core material due to bringing a tendency to become an active material for a nonaqueous secondary battery, which allows a nonaqueous secondary battery excellent in the balance among capacity, cyclability and safety.

Examples of an atmosphere for firing include the air as well as oxygen, nitrogen, carbon dioxide, watervapor, nitrogen oxides, hydrogen sulfide or mixed gas thereof, or them under reduced pressure; but yet in the case of using the core material made of a material requiring a high-concentration oxygen atmosphere in firing lithium nickelate, it is preferable to fire in an atmosphere of an oxygen concentration of 90% by volume or more so that crystallinity of the core material is not deteriorated.

It is preferable that the BET specific surface area of the active material obtained after firing is 0.7 times or more and twice or less as large as the BET specific surface area of particles of the core material since the finally obtained active material for a nonaqueous secondary battery allows a nonaqueous secondary battery excellent in capacity, cyclability and safety; more preferably 0.8 times or more and 1.2 times or less.

An active material for a nonaqueous secondary battery of the present invention is an active material for a nonaqueous secondary battery produced by firing an adherend in which a compound containing an element A (at least one element selected from among B, Al, Ga, In, Si, Ge, Sn, Mg and transition metal elements) is adhered to the particle surface of a material capable of being doped and dedoped with lithium ions, characterized in that when the active material and alkaline solution are mixed, a weight rate (W1) of the element A extracted from the active material to the alkaline solution is 3.0% or less with respect to a weight rate (W2) of the element A contained in the active material before being mixed.

The active material for the nonaqueous secondary battery of the present invention is more preferably an active material for a nonaqueous secondary battery produced by retaining an adherend, in which the compound containing the element A is adhered to the particle surface of a material capable of being doped and dedoped with lithium ions, in a water-containing atmosphere so that a weight increasing rate of the adherend is in a range of 0.1% by weight or more and 5.0% by weight or less, and firing the adherend, characterized in that when the active material and alkaline solution are mixed, the weight rate (W1) of the element A extracted from the active material to the alkaline solution is 3.0% or less with respect to the weight rate (W2) of the element A contained in the active material before being mixed.

The weight rate (W1) of the element A extracted from the active material to the alkaline solution is set to 3.0% or less with respect to the weight rate (W2) of the element A contained in the active material before being mixed, so that the active material for the nonaqueous secondary battery, which allows a nonaqueous secondary battery excellent in the balance among capacity, cyclability and safety, can be obtained. For the purpose of obtaining the active material for the nonaqueous secondary battery, which allows a nonaqueous secondary battery more excellent in cyclability and safety, the above-mentioned weight rate (W1) of the element A extracted from the active material to the alkaline solution is preferably 2% or less, more preferably 1% or less and far more preferably 0.7% or less with respect to the weight rate (W2) of the element A contained in the active material before being mixed.

Examples of the alkaline solution used in the present invention include aqueous solution or ammonia water in which hydroxide or carbonate containing at least one alkali metal selected from Li, Na and K is dissolved, and yet it is preferable to use the same alkali metal as the alkali metal used for the core material of the active material for the nonaqueous secondary battery. The aqueous solution containing the same alkali metal as alkali metal used for the core material is used as the alkaline solution, so that the dissolution of the alkali metal of the active material for the nonaqueous secondary battery tends to be capable of being restrained.

In the present invention, a method of mixing the active material and the alkaline solution prefers to be a method of contacting the active material with the alkaline solution; the active material may be contacted with the alkaline solution and thereafter mixed by stirring and shaking with a shaker, and the active material and the alkaline solution may be heated while mixed.

In the present invention, when the active material (the weight thereof is set to Ws.) and the alkaline solution are mixed to extract the element A from the active material to the alkaline solution, the extracted amount of the element A, namely, the weight of the element A in the alkaline solution increases with time, and then the amount of the element A in the alkaline solution becomes constant when a certain time (extraction time T1) passes. When the extracted amount of the element A is analyzed, the analysis is performed by using the alkaline solution after the amount thereof in the alkaline solution became constant. The heating and shaking in mixing the active material and the alkaline solution allow the extraction time (extraction time T1) of the element A to be shortened.

In the present invention, the weight of the element A in the alkaline solution is measured by using inductively coupled plasma-atomic emission spectroscopy (occasionally referred to as ICP-AES hereinafter) in consideration of aptitude for microanalysis. That is, the value of the element A in the alkaline solution obtained by measuring through ICP-AES with the use of the alkaline solution after the amount of the element A in the alkaline solution became constant is divided by Ws to obtain the weight rate (W1) of the element A extracted from the active material to the alkaline solution. With regard to the weight rate (W2) of the element A contained in the active material before being mixed, Ws of the active material is weighed and then the value of the element A obtained by measuring through ICP-AES with the use of aqueous solution obtained by dissolving the active material by contacting the active material with acidic aqueous solution such as hydrochloric acid is divided by Ws to obtain the weight rate (W2) of the element A contained in the active material before being mixed. Then, when a value such that (W1) is divided by (W2) and further multiplied by 100, namely, (W1/W2)×100(%) becomes 3 or less, the active material for the nonaqueous secondary battery, which allows a nonaqueous secondary battery excellent in the balance among capacity, cyclability and safety, can be obtained. The value of (W1/W2)×100(%) becomes more preferably 1 or less. In the present invention, the value of (W1/W2)×100(%) is occasionally referred to as element A elution rate.

In such a method as described above, an evaluation method of the active material for the nonaqueous secondary battery, such that the weight rate (W1) of the element A contained in the active material is calculated and the weight rate (W2) of the element A extracted from the active material to the alkaline solution is calculated by mixing the active material and the alkaline solution, is simple, convenient and very useful as the evaluation method of the active material for the nonaqueous secondary battery produced by firing the adherend, in which the compound containing the element A is adhered to the particle surface of the material capable of being doped and dedoped with lithium ions.

The active material for the nonaqueous secondary battery obtained by the producing method of the present invention, or the active material for a nonaqueous secondary battery of the present invention becomes an active material for a nonaqueous secondary battery, which allows a nonaqueous secondary battery excellent in cyclability and safety. Examples of the nonaqueous secondary battery herein include a lithium secondary battery described below.

A lithium secondary battery is exemplified as the nonaqueous secondary battery and a method for producing a lithium secondary battery including the positive electrode active material used by the producing method of the present invention is described below. The lithium secondary battery comprises a positive electrode composed of a positive electrode mixture and a positive electrode current collector, a negative electrode composed of a negative electrode material and a negative electrode current collector, an electrolyte, an organic solvent and a separator.

Examples of the positive electrode mixture include a content of a positive electrode active material obtained by the producing method of the present invention, a carbonaceous material as a conductive material and thermoplastic resin as a binder. Examples of the carbonaceous material include natural graphite, artificial graphite, cokes and carbon black. Each of them may be used singly as the conductive material, or artificial graphite and carbon black may be used by mixture, for example.

Examples of the thermoplastic resin include polyvinylidene fluoride (occasionally referred to as PVDF hereinafter), polytetrafluoroethylene (occasionally referred to as PTFE hereinafter), tetrafluoroethylene/hexafluoropropylene/vinylidene fluoride copolymer, hexafluoropropylene/vinylidene fluoride copolymer and tetrafluoroethylene/perfluorovinylether copolymer. These may be each used singly or used by mixture of two kinds or more. Examples of these binders to be used include a dissolved material such that a binder is dissolved in soluble organic solvent, for example, 1-methyl-2-pyrrolidone (occasionally referred to as NMP hereinafter).

When fluororesin and polyolefin resin as a binder are used in combination with the positive electrode active material of the present invention so that the rate of the fluororesin in a positive electrode mixture is 1 to 10% by weight and the rate of the polyolefin resin is 0.1 to 2% by weight, it is preferable to excel in binding property to a current collector and further improve the safety of a lithium secondary battery against external heating as is typified by a heating test.

Examples of the positive electrode current collector to be used include Al, Ni and stainless steel, and Al is preferable in view of ease to process into a thin film and inexpensiveness. Examples of a method of supporting the positive electrode mixture on the positive electrode current collector include a method of pressure-molding or a method of pasting by using solvent to fix firmly by applying, drying and thereafter pressing on the current collector.

Examples of the negative electrode material to be used for the lithium secondary battery of the present invention include a lithium metal, a lithium alloy or a material capable of being doped and dedoped with lithium ions. Examples of the material capable of being doped and dedoped with lithium ions include carbonaceous materials such as natural graphite, artificial graphite, cokes, carbon black, pyrolytic carbons, carbon fiber and organic polymeric compound fired product; and chalcogen compounds such as oxide and sulfide doped and dedoped with lithium ions at lower electric potential than a positive electrode. The carbonaceous materials having graphite materials such as natural graphite and artificial graphite as the main component are preferable from the viewpoint that the combination with a positive electrode allows a lithium secondary battery having high energy density due to high electric potential flatness and low average discharge electric potential.

In the case of using in combination with a liquid electrolyte, when the liquid electrolyte does not contain ethylene carbonate, it is preferable that the use of a negative electrode containing polyethylene carbonate improves cycling characteristics and large current discharge characteristics of a lithium secondary battery.

The shape of the carbonaceous materials may be any of a flaky shape such as natural graphite, a globular shape such as mesocarbon microbeads, a fibrous shape such as graphitized carbon fiber and an aggregate of fine powder; thermoplastic resin as a binder can be added thereto as required. Examples of thermoplastic resin include PVDF, polyethylene and polypropylene.

Examples of the chalcogen compounds such as oxide and sulfide used as a negative electrode material include crystalline or amorphous oxide comprising mainly Group 13, 14, 15 elements in the periodic table, such as an amorphous compound comprising mainly a tin compound. The carbonaceous materials as conductive materials and thermoplastic resin as a binder can be added thereto as required.

Examples of the negative electrode current collector to be used include Cu, Ni and stainless steel, and particularly in a lithium secondary battery, Cu is preferable in view of difficulty to be made into alloy with lithium and ease to process into a thin film. Examples of a method of supporting a mixture containing a negative electrode active material on the negative electrode current collector include a method of pressure-molding or a method of pasting by using solvent to fix firmly by applying, drying and thereafter pressing on the current collector.

Examples of a separator to be used in the lithium secondary battery of the present invention include materials having porous, nonwoven fabric or woven fabric forms, made of olefin resin such as fluororesin, polyethylene and polypropylene, nylon and aromatic aramid. The thinner thickness of the separator is more favorable, preferably approximately 10 to 200 µm, as far as mechanical strength is retained from the viewpoint that volume energy density as a battery is increased and internal resistance is decreased.

Examples of an electrolyte to be used in the lithium secondary battery as an embodiment of the present invention include a known electrolyte selected from either of nonaqueous electrolyte solution such that lithium salt is dissolved in organic solvent and solid electrolyte. Examples of lithium salts include one kind or a mixture of two kinds or more among $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lithium lower aliphatic carboxylate, $LiAlCl_4$ and $LiB(C_2O_4)_2$.

Examples of the organic solvent to be used in the lithium secondary battery as an embodiment of the present invention include carbonates such as propylene carbonate, ethylene carbonate, dimethyl carbonate, diethyl carbonate, ethyl methyl carbonate, 4-trifluoromethyl-1,3-dioxolan-2-one and 1,2-di(methoxycarbonyloxy)ethane; ethers such as 1,2-dimethoxyethane, 1,3-dimethoxypropane, pentafluoropropyl methyl ether, 2,2,3,3-tetrafluoropropyldifluoro methyl ether, tetrahydrofuran and 2-methyltetrahydrofuran; esters such as methyl formate, methyl acetate and γ-butyrolactone; nitrites such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide and 1,3-propanesultone; and materials such that fluorine substituent is further introduced into the above-mentioned organic solvents, two kinds or more thereof being typically used by mixture. Among them, mixed solvents containing carbonates are preferable, and mixed solvents of cyclic carbonate and acyclic carbonate, or cyclic carbonate and ethers are more preferable.

The mixed solvents of cyclic carbonate and acyclic carbonate are preferably mixed solvents containing ethylene carbonate, dimethyl carbonate and ethyl methyl carbonate in view of allowing wide operating temperature range, a lithium secondary battery excellent in load characteristic, and persistency even in the case of using graphite materials such as natural graphite and artificial graphite as a negative electrode active material.

The lithium salt containing fluorine such as $LiPF_6$ and/or the electrolyte containing the organic solvent having fluorine substituent are preferably used from the viewpoint that the positive electrode active material obtained in the present invention is a stratified rock salt type crystal structure containing Li, Ni and/or Co, and the particularly excellent effect of improving safety is obtained in the case of further containing Al. A mixed solvent containing ethers having fluorine substituent such as pentafluoropropyl methyl ether and 2,2,3,3-tetrafluoropropyldifluoro methyl ether as well as dimethyl carbonate is more preferable by reason of allowing a lithium secondary battery excellent also in large current discharge characteristics.

Examples of the solid electrolyte to be used include polyelectrolytes such as polyethylene oxide-based polymeric compounds, and polymeric compounds containing at least one kind or more of polyorganosiloxane chain or polyoxyalkylene chain. The so-called gel type such that nonaqueous electrolyte solution is retained by macromolecules can also be used. Sulfide-based electrolytes such as $Li_2S$—$SiS_2$, $Li_2S$—$GeS_2$, $Li_2S$—$P_2S_5$ and $Li_2S$—$B_2S_3$, or inorganic compound electrolytes containing sulfides such as $Li_2S$—$SiS_2$—$Li_3PO_4$ and $Li_2S$—$SiS_2$—$Li_2SO_4$ can also be used from the viewpoint of further improving safety of a lithium secondary battery.

The shape of the lithium secondary battery of the present invention is not particularly limited but may be any of paper type, coin type, cylindrical type and square type.

A bag-shaped package made of laminated sheets containing aluminum may be used without using a metallic hard case serving also for negative electrode or positive electrode terminal as the exterior.

The present invention is hereinafter described in further detail by examples and not limited thereto. The preparation of electrodes for a charge discharge test and a planar-type battery was based on the following method unless otherwise specified.

1-methyl-2-pyrrolidone (occasionally referred to as NMP hereinafter) solution of PVDF as a binder was added and kneaded to a mixture of compound particles capable of being doped and dedoped with alkali metal ions as an active material, and acetylene black as a conductive material so as to have a composition of the active material:the conductive material: the binder=86:10:4 (weight ratio) to thereby obtain paste for a positive electrode mixture, which paste was applied to #100 stainless mesh as a current collector and vacuum-dried at 150° C. for 8 hours to obtain a positive electrode.

The obtained positive electrode was combined with a dissolved material (occasionally referred to as $LiPF_6$/EC+ DMC+EMC hereinafter) as electrolytic solution, such that $LiPF_6$ was dissolved in a 30:35:35% byvolume-liquidmixture of ethylene carbonate (occasionally referred to as EC hereinafter), dimethyl carbonate (occasionally referred to as DMC hereinafter) and ethyl methyl carbonate (occasionally referred to as EMC hereinafter) so as to have a concentration of 1.0 mol/L, a polypropylene porous membrane as a separator, and metallic lithium as a counter electrode (negative electrode) to prepare a planar-type battery.

EXAMPLE 1

(1) Production of Particles of Core Material

Lithium hydroxide ($LiOH.H_2O$: manufactured by THE HONJO CHEMICAL CORPORATION, milled product, average particle diameter of 10 to 25 μm), nickel hydroxide ($Ni(OH)_2$: manufactured by TANAKA CHEMICAL CORPORATION, product name: nickel hydroxide D, average particle diameter of approximately 20 μm) and cobalt hydroxide ($Co(OH)_2$: manufactured by TANAKA CHEMICAL CORPORATION, product name: cobalt hydroxide, average particle diameter of 2 to 3 μm) previously dried in an air at 150° C. for 12 hours were measured so that an atomic ratio of each of the metals became the following molar ratio, and mixed by using a V-type mixer to thereby obtain raw material mixed powder.

Li:Ni:Co=1.05:0.85:0.15

The obtained raw material mixed powder was dried at 120° C. for 12 hours, and thereafter finely ground and mixed under the following conditions by using a dynamic mill (MYD-5XA type, manufactured by MITSUI MINING COMPANY, LIMITED) to obtain ground raw material powder.

grinding medium: 5 mmφ high alumina (6.1 kg)
the number of revolutions of an agitator shaft: 650 rpm
feed rate of dried raw material mixed powder: 10.3 kg/h The ground raw material powder was filled into an alumina capsule and fired in an oxygen flow at 720° C. for 15 hours to obtain a massive material. This massive material was ground with a dry ball mill by using a 15 mmφ nylon-coated steel ball as a grinding medium until an average particle diameter on the basis of volume became 5.5 μm (measured by a laser diffraction particle-size distribution measuring apparatus SALD-1100 type (manufactured by SHIMADZU CORPORATION)) to obtain particles C1 of a core material. It was confirmed by powder X-ray diffraction that the obtained particles C1 of a core material had an α-$NaFeO_2$ type structure. The BET specific surface area of the particles C1 of a core material measured 0.9 $m^2$/g by BET one point method with a BET specific surface area measuring apparatus Macsorb HM Model-1208 type (manufactured by MOUNTECH CO., LTD.).

(2) Method for Producing Adherend 900 g of the obtained particles C1 of a core material and 37.4 g (added thereto so as to become Al element of 0.08 part by mole with respect to (Ni+Co) in the particles C1 of a core material) of aluminum oxide (manufactured by NIPPON AEROSIL, primary particle diameter of 13 nm, product name: alumina C) were sealed into a pot made of polyethylene with an internal volume of 5 L, and thereafter mixed with a dry ball mill at 80 rpm for 30 minutes by using a 15 mmφ nylon-coated steel ball of 4.2 kg as a medium to obtain an adherend H1. The BET specific surface area of the aluminum oxide used herein measured 113 $m^2$/g, and the ratio of the BET specific surface area of the aluminum oxide to the BET specific surface area of the particles of a core material was calculated as 126.

(3) Treatment of Adherend 180 g of the obtained adherend H1 was filled into a stainless tray (400×240×66 mmt) and set in a thermo-hygrostat adjusted to 30° C. and a relative humidity of 70%. Then, after retaining for 17.5 hours without introducing carbon dioxide gas into the system, the stainless tray was taken out of the. thermo-hygrostat to obtain an adhered retention material K1 with a weight increasing rate of 1.5% by weight. The adhered retention material K1 was fired in an oxygen flow at 720° C. for 1 hour to obtain powder S1. The BET specific surface area of the powder S1 measured 0.9 m$^2$/g. The BET specific surface area ratio of the powder S1 to the particles C1 of a core material was calculated as 1.0.

(4) Charge and Discharge Performance Evaluation in the Case of Obtaining Positive Electrode Active Material of Lithium Secondary Battery A planar-type battery was prepared by using the obtained powder S1 to perform a charge and discharge test by constant-current constant-voltage charge and constant-current discharge under the following conditions.

charging maximum voltage: 4.3 V
    charging current: 0.7 mA/cm$^2$
    charging time: 8 hours (set to a charging time of 12 hours only in the initial two-time charges)
    discharge minimum voltage: 3.0 V
    discharge current: 0.7 mA/cm$^2$ The first-time discharge capacity was 186 mAh/g and (discharge capacity after 20 cycles)/(discharge capacity after 10 cycles) ratio (cyclability) was 96.4%, whereby high capacity and high cyclability were exhibited.

(5) Evaluation of Safety

In order to evaluate safety by examining reaction behavior in the case of being heated in a state of deep charge, closed type DSC measurement was performed in the following procedures. First, a planar-type battery was prepared in combination with metallic lithium by using the powder S1 to perform constant-current constant-voltage charge under the following conditions.

charging maximum voltage: 4.3 V
    charging current: 0.5 mA/cm$^2$
    charging time: 20 hours The battery after being charged was disassembled in a glove box in an argon atmosphere to take out a positive electrode, which was washed in DMC and dried to thereafter scrape a positive electrode mixture off a current collector and obtain a charged positive electrode mixture. Subsequently, 0.8 mg of the charged positive electrode mixture was gathered by weighing into a stainless-steel sealed cell to further inject solution as nonaqueous electrolyte solution thereinto, such that LiPF$_6$ was dissolved in a liquid mixture of EC:VC:DMC:EMC=12:3:20:65% by volume so as to have a concentration of 1 mol/L, by 1.5 μl so that the charged positive electrode mixture got wet therewith, and then seal the cell by using a jig.

Subsequently, the above-mentioned sealed stainless-steel cell was set in DSC220 type (manufactured by SEIKO INSTRUMENTS INC.) to measure at a rate of temperature rise of 10° C./min. The calorific value measured 490 mJ/mg.

EXAMPLE 2

(1) Production of Particles of Core Material

Lithium hydroxide (LiOH.H$_2$O; manufactured by THE HONJO CHEMICAL CORPORATION, milled product, average particle diameter of 10 to 25 μm), nickel hydroxide (Ni(OH)$_2$; manufactured by KANSAI CATALYST CO., LTD., product name: nickel hydroxide No. 3) and cobalt oxide (Co$_3$O$_4$; manufactured by SEIDO CHEMICAL INDUSTRY CO., LTD., product name: cobalt oxide (HCO)) were weighed so that an atomic ratio of each of the metals became the following molar ratio, and mixed by using a Loedige mixer (manufactured by MATSUBO CORPORATION, M-20 type) to thereby obtain raw material mixed powder.

Li:Ni:Co=1.05:0.85:0.15

The obtained raw material mixed powder was dried at 120° C. for 10 hours, and thereafter finely ground and mixed under the following conditions by using a dynamic mill (MYD-5XA type, manufactured by MITSUI MINING COMPANY, LIMITED).

grinding medium: 5 mmϕ high alumina (6.1 kg)
    the number of revolutions of an agitator shaft: 650 rpm
    feed rate of dried raw material mixed powder: 12.0 kg/h The ground raw material powder was fired and ground under the same conditions as Example 1 (1) to prepare particles C2 of a core material (BET specific surface area: 1.0 m$^2$/g) and thereafter obtain an adherend H2 by the same method as Example 1 (2). The ratio of the BET specific surface area of the aluminum oxide to the BET specific surface area of the particles of a core material was calculated as 113.

720 g of the obtained adherend H2 was filled into four stainless trays (400×240×66 mmt) separately (filled by 180 g into each of the stainless trays), which stainless trays were thereafter set in a thermo-hygrostat (PR-2K[H], internal volume of 225 L) adjusted to 50° C. and a relative humidity of 60%. Then, carbon dioxide gas was introduced into the system at 19 mL/min (20° C.). After retaining for 3 hours, the stainless trays were taken out of the thermo-hygrostat to obtain an adhered retention material K2 with a weight increasing rate of 1.5% by weight. Carbon dioxide gas originally existing in the system was calculated as 0.1 g when carbon dioxide gas concentration in the air was 0.03% by volume. The introduced carbon dioxide gas amount was calculated as 2.1 g/h. Thus, the carbon dioxide gas amount with respect to the adherend per unit weight was calculated as 3.0 mg/h/(g-adherend).

The adhered retention material K2 was fired in an oxygen flow at 725° C. for 1 hour to obtain powder S2. The BET specific surface area of the powder S2 measured 1.0 m$^2$/g. The BET specific surface area ratio of the powder S2 to the particles C2 of a core material was calculated as 1.0.

When charge and discharge characteristics were measured on the same conditions as Example 1 by using the powder S2 for a positive electrode active material, the first-time discharge capacity was 186 mAh/g and (discharge capacity after 20 cycles)/(discharge capacity after 10 cycles) ratio (cyclability) was 96.2%, whereby high capacity and high cyclability were exhibited.

When measured on the same conditions as Example 1 by using the powder S2 for a positive electrode active material, the DSC calorific value was 470 mJ/mg.

EXAMPLE 3

360 g of the adherend H2 obtained in Example 2 was filled into two stainless trays (400×240×66 mmt) separately (filled by 180 g into each of the stainless trays), which stainless trays were thereafter set in a thermo-hygrostat adjusted to 50° C. and a relative humidity of 60%. Then, carbon dioxide gas was introduced into the system at 8.4 mL/min (20° C.). After 2 hours, the stainless trays were taken out of the thermo-hygrostat to obtain an adhered retention material K3 with a weight increasing rate of 1.0% by weight. When calculated in the same method as Example 2, the carbon dioxide gas amount with respect to the adherend per unit weight was 2.7 mg/h/(g-adherend).

The adhered retention material K3 was hereafter fired under the same conditions as Example2.to obtain powder S3. The BET specific surface area of the powder S3 measured 1.0 m²/g. The BET specific surface area ratio of the powder S3 to the particles C2 of a core material was calculated as 1.0.

When charge and discharge characteristics were measured on the same conditions as Example 1 by using the powder S3 for a positive electrode active material, the first-time discharge capacity was 185 mAh/g and (discharge capacity after 20 cycles)/(discharge capacity after 10 cycles) ratio (cyclability) was 96.3%, whereby high capacity and high cyclability were exhibited.

When measured on the same conditions as Example 1 by using the powder S3 for a positive electrode active material, the DSC calorific value was 490 mJ/mg.

EXAMPLE 4

360 g of the adherend H2 obtained in Example 2 was filled into two stainless trays (400×240×66 mmt) separately (filled by 180 g into each of the stainless trays), which stainless trays were thereafter set in a thermo-hygrostat adjusted to 50° C. and a relative humidity of 60%. Then, carbon dioxide gas was introduced into the system at 8.4 mL/min (20° C.). After 5 hours, the stainless trays were taken out of the thermo-hygrostat to obtain an adhered retention material K4 with a weight increasing rate of 2.0% by weight. When calculated in the same method as Example 2, the carbon dioxide gas amount with respect to the adherend per unit weight was 2.6 mg/h/(g-adherend).

The adhered retention material K4 was hereafter fired under the same conditions as Example 2 to obtain powder S4. The BET specific surface area of the powder S4 measured 1.0 m²/g. The BET specific surface area ratio of the powder S4 to the particles C2 of a core material was calculated as 1.0.

When charge and discharge characteristics were measured on the same conditions as Example 1 by using the powder S4 for a positive electrode active material, the first-time discharge capacity was 186 mAh/g and (discharge capacity after 20 cycles)/(discharge capacity after 10 cycles) ratio (cyclability) was 96.2%, whereby high capacity and high cyclability were exhibited.

When measured on the same conditions as Example 1 by using the powder S4 for a positive electrode active material, the DSC calorific value was 470 mJ/mg.

COMPARATIVE EXAMPLE 1

A planar-type battery was prepared by using the particles C1 of a core material for a positive electrode active material to perform a charge and discharge test by constant-current constant-voltage charge and constant-current discharge under the following conditions.

charging maximum voltage: 4.3 V
charging current: 0.8 mA/cm²
charging time: 8 hours (set to a charging time of 12 hours only in the initial two-time charges)
discharge minimum voltage: 3.0 V
discharge current: 0.8 mA/cm²

The first-time discharge capacity was 203 mAh/g and (discharge capacity after 20 cycles)/(discharge capacity after 10 cycles) ratio (cyclability) was 93.5%, resulting in high discharge capacity and somewhat poor cycling characteristics.

When measured on the same conditions as Example 1 by using the particles C1 of a core material for a positive electrode active material, the DSC calorific value was as high as 650 mJ/mg.

COMPARATIVE EXAMPLE 2

The adherend H1 obtained in Example 1 was fired with the omission of the retaining step in a water-containing atmosphere by the same method as Example 1 to obtain powder S5. The BET specific surface area of the powder S5 measured 1.1 m²/g. The BET specific surface area ratio of the powder S5 to the particles C1 of a core material was calculated as 1.1.

When charge and discharge characteristics were measured on the same conditions as Example 1 by using the obtained powder S5 for a positive electrode active material, the first-time discharge capacity was 186 mAh/g and (discharge capacity after 20 cycles)/(discharge capacity after 10 cycles) ratio (cyclability) was 96.5%, whereby high capacity and high cyclability were exhibited.

However, when measured on the same conditions as Example 1 by using the powder S5 for a positive electrode active material, the DSC calorific value was as high as 600 mJ/mg.

COMPARATIVE EXAMPLE 3

When charge and discharge characteristics were measured on the same conditions as Comparative Example 1 by using the particles C2 of a core material for a positive electrode active material, the first-time discharge capacity was 206 mAh/g and (discharge capacity after 20 cycles)/(discharge capacity after 10 cycles) ratio (cyclability) was 94.6%, resulting in high discharge capacity and somewhat poor cycling characteristics.

When measured on the same conditions as Example 1 by using the particles C2 of a core material for a positive electrode active material, the DSC calorific value was as high as 570 mJ/mg.

COMPARATIVE EXAMPLE 4

The adherend H2 obtained in Example 2 was fired with the omission of the retaining step in a water-containing atmosphere by the same method as Example 3 to obtain powder S6. The BET specific surface area of the powder S6 measured 1.1 m²/g. The BET specific surface area ratio of the powder S6 to the particles C2 of a core material was calculated as 1.1.

When charge and discharge characteristics were measured on the same conditions as Example 1 by using the obtained powder S6 for a positive electrode active material, the first-time discharge capacity was 187 mAh/g and (discharge capacity after 20 cycles)/(discharge capacity after 10 cycles) ratio (cyclability) was 96.4%, whereby high capacity and high cyclability were exhibited.

However, when measured on the same conditions as Example 1 by using the powder S6 for a positive electrode active material, the DSC calorific value was as high as 600 mJ/mg.

TABLE 1

| | Adhered compound | CO$_2$ amount | water vapor retention of adherend Retention time (h) | Adherend weight increasing rate (% by weight) | Adhered retention material firing conditions | BET specific surface area (m$^2$/g) |
|---|---|---|---|---|---|---|
| Example 1 | Alumina | In the air | 17.5 | 1.5 | 720° C. 1 h | 0.9 |
| Example 2 | Alumina | 3.0 | 3 | 1.5 | 725° C. 1 h | 1.0 |
| Example 3 | Alumina | 2.7 | 2 | 1.0 | 725° C. 1 h | 1.0 |
| Example 4 | Alumina | 2.6 | 5 | 2.0 | 725° C. 1 h | 1.0 |
| Comparative Example 1 | None | | No retaining | | None | 0.9 (Core Material) |
| Comparative Example 2 | Alumina | | No retaining | | 720° C. 1 h | 1.1 |
| Comparative Example 3 | None | | No retaining | | None | 1.0 (Core Material) |
| Comparative Example 4 | Alumina | | No retaining | | 725° C. 1 h | 1.1 |

TABLE 2

| | First-time discharge capacity (mAh/g) | Twentieth-time discharge capacity/tenth-time discharge capacity (cyclability) (%) | DSC calorific value (mJ/mg) |
|---|---|---|---|
| Example 1 | 186 | 96.4 | 490 |
| Example 2 | 186 | 96.2 | 470 |
| Example 3 | 185 | 96.3 | 490 |
| Example 4 | 186 | 96.2 | 470 |
| Comparative Example 1 | 203 | 93.5 | 650 |
| Comparative Example 2 | 186 | 96.5 | 600 |
| Comparative Example 3 | 206 | 94.6 | 570 |
| Comparative Example 4 | 187 | 96.4 | 600 |

EXAMPLE 5

(1) Production of Particles of Core Material

Lithium carbonate (Li$_2$CO$_3$: manufactured by THE HONJO CHEMICAL CORPORATION), nickel hydroxide (Ni(OH)$_2$: manufactured by KANSAI CATALYST CO., LTD.), manganese oxide (MnO$_2$: manufactured by JAPAN PURE CHEMICAL CO., LTD.), tricobalt tetraoxide (Co$_3$O$_4$: manufactured by SEIDO CHEMICAL INDUSTRY CO., LTD.) and boric acid (H$_3$BO$_3$: manufactured by Yoneyama Co., Ltd.) were measured so that an atomic ratio of each of the metals became the following molar ratio, and mixed by using a Loedige mixer (manufactured by CHUOUKIKO CO., LTD., M-20) to thereby obtain raw material mixed powder.

Li:Ni:Mn:Co:B=1.04:0.34:0.42:0.2:0.03

The obtained raw material mixed powder was finely ground and mixed under the following conditions by using a ball mill mixer to obtain ground raw material powder.

grinding medium: 15 mmϕ alumina ball (5.8 kg)
the number of revolutions of a ball mill: 80 rpm
capacity of a ball mill: 5 L The ground raw material powder was filled into an alumina capsule and fired under the air atmosphere at 1040° C. for 4 hours to obtain a massive material. This massive material was ground with a dry ball mill under the same conditions as in raw material grinding by using a 15 mmϕ alumina ball as a grinding medium until the average particle diameter on the basis of volume became approximately 3 μm (measured by a laser diffraction particle-size distribution measuring apparatus; Malvern Mastersizer 2000, manufactured by Malvern Instruments Ltd.) to obtain particles C7 of a core material. It was confirmed by powder X-ray diffraction that the obtained particles C7 of a core material had an α-NaFeO$_2$ type structure. The BET specific surface area of the particles C7 of a core material measured 1.6 m$^2$/g by BET one point method with a BET specific surface area measuring apparatus Macsorb HM Model-1208 type (manufactured by MOUNTECH CO., LTD.).

(2) Method for Producing Adherend 3.0 g of the obtained particles C7 of a core material and 0.0639 g (added thereto so as to become Al element of 0.04 part by mole with respect to 1 part by mole of the particles C7 of a core material) of aluminum oxide (manufactured by NIPPON AEROSIL, primary particle diameter of 13 nm, product name: alumina C) were mixed with an agate mortar for 5 minutes to obtain an adherend H7. The ratio of the BET specific surface area of the aluminum oxide to the BET specific surface area of the particles of a core material was calculated as 70.6.

(3) Treatment of Adherend 20 g of the obtained adherend H7 was filled into a stainless tray (400×240×66 mmt) and set in a thermo-hygrostat adjusted to 50° C. and a relative humidity of 60%. Then, carbon dioxide gas was introduced into the system at 1.0 mL/min (20° C.). After 2 hours, the stainless trays were taken out of the thermo-hygrostat to obtain an adhered retention material K7 with a weight increasing rate of 1.2% by weight. When calculated in the same method as Example 2, the carbon dioxide gas amount with respect to the adherend per unit weight was 5.9 mg/h/(g-adherend). The adhered retention material K7 was fired under the air atmosphere at 725° C. for 1 hour to obtain powder S7. The BET specific surface area of the powder S7 measured 0.6 m$^2$/g. The BET specific surface area ratio of the powder S7 to the particles C7 of a core material was calculated as 0.38.

When charge and discharge characteristics were measured on the same conditions as Example 1 except for modifying charging current and discharge current into 0.6 mA/cm$^2$, and charging time into 8 hours by using the powder S7 for a positive electrode active material, the first-time discharge capacity was 155 mAh/g and (discharge capacity after 20 cycles)/(discharge capacity after 10 cycles) ratio (cyclability) was 99.9%, whereby high capacity and high cyclability were exhibited.

When measured on the same conditions as Example 1 except for modifying charging current and discharge current into 0.4 mA/cm² by using the powder S7 for a positive electrode active material, the DSC calorific value was 360 mJ/mg.

COMPARATIVE EXAMPLE 5

When charge and discharge characteristics were measured on the same conditions as Example 5 by using the particles C7 of a core material in Example 5 for a positive electrode active material, the first-time discharge capacity was 162 mAh/g and (discharge capacity after 20 cycles)/(discharge capacity after 10 cycles) ratio (cyclability) was 96.3%.

When measured on the same conditions as Example 5 by using the particles C7 of a core material for a positive electrode active material, the DSC calorific value was 490 mJ/mg.

EXAMPLE 6

(1) Production of Particles of Core Material

Lithium hydroxide ($LiOH.H_2O$; manufactured by THE HONJO CHEMICAL CORPORATION, milled product, average particle diameter of 10 to 25 μm), nickel hydroxide ($Ni(OH)_2$; manufactured by KANSAI CATALYST CO., LTD., product name: nickel hydroxide No. 3) and cobalt oxide ($Co_3O_4$; manufactured by SEIDO CHEMICAL INDUSTRY CO., LTD., product name: cobalt oxide (HCO)) were measured so that an atomic ratio of each of the metals became the following molar ratio, and mixed by using a V-type mixer to thereby obtain raw material mixed powder.

Li:Ni:Co=1.05:0.85:0.15

The obtained raw material mixed powder was dried at 120° C. for 10 hours, and thereafter finely ground and mixed under the following conditions by using a dynamic mill (MYD-SXA type, manufactured by MITSUI MINING COMPANY, LIMITED) to obtain ground raw material powder.

grinding medium: 5 mmφ high alumina (6.1 kg)
the number of revolutions of an agitator shaft: 650 rpm
feed rate of dried raw material mixed powder: 12.0 kg/h The ground raw material powder was filled into an alumina capsule and fired in an oxygen flow at 730° C. for 15 hours to obtain a massive material. This massive material was ground with a dry ball mill by using a 15 mmφ nylon-coated steel ball as a grinding medium until the average particle diameter on the basis of volume became 5.5 μm (measured by a laser diffraction particle-size distribution measuring apparatus SALD-1100 type (manufactured by SHIMADZU CORPORATION)) to obtain particles C8 of a core material. It was confirmed by powder X-ray diffraction that the obtained particles C8 of a core material had an α-$NaFeO_2$ type structure.

(2) Method for Producing Adherend 1000 g of the obtained particles C8 of a core material and 41.8 g (added thereto so as to become Al element of 0.08 part by mole with respect to (Ni+Co) in the particles C8 of a core material) of aluminum oxide (manufactured by NIPPON AEROSIL, primary particle diameter of 13 nm, product name: alumina C) were sealed into a pot made of polyethylene with an internal volume of 5 L, and thereafter mixed with a dry ball mill at 80 rpm for 30 minutes by using a 15 mmφ nylon-coated steel ball of 4.2 kg as a medium to obtain an adherend H8.

(3) Treatment of Adherend 200 g of the obtained adherend H8 was filled into a stainless tray (400×240×66 mmt) and set in a thermo-hygrostat adjusted to 50° C. and a relative humidity of 60%. Then, carbon dioxide gas was introduced into the system at 30 mL/min. After retaining for 3.5 hours, the stainless tray was taken out of the thermo-hygrostat to obtain an adhered retention material K8 with a weight increasing rate of 1.5% by weight. The adhered retention material K8 was fired in an oxygen flow at 725° C. for 1.25 hours to obtain powder S8. The BET specific surface area of the powder S8 measured 0.9 m²/g.

(4) Charge and Discharge Performance Evaluation and Evaluation of Safety

When charge and discharge characteristics were measured on the same conditions as Example 1 by using the powder S8 for a positive electrode active material, the first-time discharge capacity was 182 mAh/g and (discharge capacity after 20 cycles)/(discharge capacity after 10 cycles) ratio (cyclability) was 95.7%, whereby high capacity and high cyclability were exhibited.

When measured on the same conditions as Example 1 by using the powder S8 for a positive electrode active material, the DSC calorific value was 440 mJ/mg.

(5) Measurement of Element A Elution Rate (the Element A is Al)

W2 was calculated through ICP-AES (manufactured by SEIKO INSTRUMENTS INC.) with the use of aqueous solution obtained by dissolving the powder S8 in hydrochloric acid. W2 was 0.015.

W1 was calculated through ICP-AES with the use of supernatant liquid obtained in such a method that 0.1 g of the powder S8 and 10 mL of 1 mol/l-lithium hydroxide aqueous solution were projected into a vessel made of polypropylene with a capacity of 15 mL, which vessel was immersed in a water bath of 60° C. for 4 hours. W1 was 0.00011. Thus, Al elution rate was calculated as 0.7% by the expression (W1/W2)×100.

In the Example, the use conditions of the apparatus of ICP-AES adopted the following conditions unless otherwise specified.

plasma output: 1.2 kW
carrier gas flow rate: 0.4 L/min
plasma gas flow rate: 15 L/min
auxiliary gas flow rate: 0.3 L/min
Al measuring wavelength: 396.15 nm

EXAMPLE 7

(1) Production of Particles of Core Material

Lithium hydroxide ($LiOH.H_2O$; manufactured by THE HONJO CHEMICAL CORPORATION, milled product, average particle diameter of 10 to 25 μm), nickel hydroxide ($Ni(OH)_2$; manufactured by KANSAI CATALYST CO., LTD., product name: nickel hydroxide No. 3) and cobalt oxide ($Co_3O_4$; manufactured by SEIDO CHEMICAL INDUSTRY CO., LTD., product name: cobalt oxide (HCO)) were weighed so that an atomic ratio of each of the metals became the following molar ratio, and mixed by using a Loedige mixer (manufactured by MATSUBO CORPORATION, M-20 type) to thereby obtain raw material mixed powder.

Li:Ni:Co=1.05:0.85:0.15

The obtained raw material mixed powder was dried at 120° C. for 10 hours, and thereafter finely ground and mixed under the following conditions by using a dynamic mill (MYD-5XA type, manufactured by MITSUI MINING COMPANY, LIMITED).

grinding medium: 5 mmϕ high alumina (6.1 kg)
the number of revolutions of an agitator shaft: 650 rpm
feed rate of dried raw material mixed powder: 12.0 kg/h The ground raw material powder was filled into an alumina capsule and fired in an oxygen flow at 730° C. for 15 hours to obtain a massive material. This massive material was ground with a dry ball mill by using a 15 mmϕ nylon-coated steel ball as a grinding medium until the average particle diameter on the basis of volume became 5.5 μm (measured by a laser diffraction particle-size distribution measuring apparatus SALD-1100 type (manufactured by SHIMADZU CORPORATION)) to obtain particles C9 of a core material. It was confirmed by powder X-ray diffraction that the obtained particles C9 of a core material had an α-$NaFeO_2$ type structure.

(2) Method for Producing Adherend 900 g of the obtained particles C9 of a core material and 37.6 g (added thereto so as to become Al element of 0.08 part by mole with respect to (Ni+Co) in the particles C8 of a core material) of aluminum oxide (manufactured by NIPPON AEROSIL, primary particle diameter of 13 nm, product name: alumina C) were sealed into a pot made of polyethylene with an internal volume of 5 L, and thereafter mixed with a dry ball mill at 80 rpm for 30 minutes by using a 15 mmϕ nylon-coated steel ball of 4.2 kg as a medium to obtain an adherend H9.

(3) Treatment of Adherend 180 g of the obtained adherend H9 was filled into a stainless tray (400×240×66 mmt) and set in a thermo-hygrostat adjusted to 50° C. and a relative humidity of 60%. Then, carbon dioxide gas was introduced into the system at 8 mL/min. After retaining for 2.0 hours, the stainless tray was taken out of the thermo-hygrostat to obtain an adhered retention material K9 with a weight increasing rate of 1.0% by weight. The adhered retention material K9 was fired in an oxygen flow at 725° C. for 1.0 hour to obtain powder S9. The BET specific surface area of the powder S9 measured 1.0 $m^2/g$.

(4) Charge and Discharge Performance Evaluation and Evaluation of Safety

When charge and discharge characteristics were measured on the same conditions as Example 1 by using the powder S9 for a positive electrode active material, the first-time discharge capacity was 185 mAh/g and (discharge capacity after 20 cycles)/(discharge capacity after 10 cycles) ratio (cyclability) was 96.0%, whereby high capacity and high cyclability were exhibited.

When measured on the same conditions as Example 1 by using the powder S9 for a positive electrode active material, the DSC calorific value was 470 mJ/mg.

(5) Measurement of Element A Elution Rate (the Element A is Al)

W2 was calculated through ICP-AES (manufactured by SEIKO INSTRUMENTS INC.) with the use of aqueous solution obtained by dissolving the powder S9 in hydrochloric acid. W2 was 0.016.

W1 was calculated through ICP-AES with the use of supernatant liquid obtained in such a method that 0.1 g of the powder S8 and 10 mL of 1 mol/L-lithium hydroxide aqueous solution were projected into a vessel made of polypropylene with a capacity of 15 mL, which vessel was immersed in a water bath of 60° C. for 4 hours. W1 was 0.000069. Thus, Al elution rate was calculated as 0.4% by the expression (W1/W2)×100.

EXAMPLE 8

180 g of the adherend H9 obtained in Example 7 was filled into a stainless tray (400×240×66 mmt) and set in a thermo-hygrostat adjusted to 50° C. and a relative humidity of 60%. Then, carbon dioxide gas was introduced into the system at 8 mL/min. After retaining for 4.8 hours, the stainless tray was taken out of the thermo-hygrostat to obtain an adhered retention material K10 with a weight increasing rate of 2.0% by weight. The adhered retention material K10 was fired in an oxygen flow at 725° C. for 1.0 hour to obtain powder S10. The BET specific surface area of the powder S10 measured 1.0 $m^2/g$. When charge and discharge characteristics were measured on the same conditions as Example 1 by using the obtained powder S10, the first-time discharge capacity was 186 mAh/g and (discharge capacity after 20 cycles)/(discharge capacity after 10 cycles) ratio (cyclability) was 95.6%, whereby high capacity and high cyclability were exhibited.

When measured on the same conditions as Example 1 by using the powder S10 for a positive electrode active material, the DSC calorific value was 480 mJ/mg.

W2 was calculated through ICP-AES (manufactured by SEIKO INSTRUMENTS INC.) with the use of aqueous solution obtained by dissolving the powder S10 in hydrochloric acid. W2 was 0.016.

W1 was calculated through ICP-AES with the use of supernatant liquid obtained in such a method that 0.1 g of the powder S10 and 10 mL of 1 mol/L-lithium hydroxide aqueous solution were projected into a vessel made of polypropylene with a capacity of 15 mL, which vessel was immersed in a water bath of 60° C. for 4 hours. W1 was 0.00020. Thus, Al elution rate was calculated as 1.2% by the expression (W1/W2)×100.

COMPARATIVE EXAMPLE 6

The adherend H9 obtained in Example 7 was fired in an oxygen flow at 725° C. for 1.0 hour to obtain powder S11. The BET specific surface area of the powder S11 measured 1.1 $m^2/g$. When charge and discharge characteristics were measured on the same conditions as Example 1 by using the obtained powder S11, the first-time discharge capacity was 186 mAh/g and (discharge capacity after 20 cycles)/(discharge capacity after 10 cycles) ratio (cyclability) was 96.1%, whereby high capacity and high cyclability were exhibited.

When measured on the same conditions as Example 1 by using the powder S11 for a positive electrode active material, the DSC calorific value was 590 mJ/mg.

W2 was calculated through ICP-AES (manufactured by SEIKO INSTRUMENTS INC.) with the use of aqueous solution obtained by dissolving the powder S11 in hydrochloric acid. W2 was 0.016.

W1 was calculated through ICP-AES with the use of supernatant liquid obtained in such a method that 0.1 g of the powder S11 and 10 mL of 1 mol/L-lithium hydroxide aqueous solution were projected into a vessel made of polypropylene with a capacity of 15 mL, which vessel was immersed in a water bath of 60° C. for 4 hours. W1 was 0.00052. Thus, Al elution rate was calculated as 3.2% by the expression (W1/W2)×100.

The invention claimed is:

1. A method for producing an active material for a non-aqueous secondary battery, comprising retaining an adherend in a water-containing atmosphere so that a weight increasing rate of the adherend is in a range of 0.1% by weight or more and 5.0% by weight or less, and then firing the adherend after retaining the adherend in the water-containing atmosphere, wherein the adherend comprises a material capable of being doped and dedoped with lithium ions, and a compound containing at least one element (element A) selected from among B, Al, Ga, In, Si, Ge, Sn, Mg and transition metal elements, the compound is adhered to a particle surface of the material capable of being doped and dedoped with lithium ions, the compound has a BET specific surface area of twenty times or more as large as that of the material capable of being doped and dedoped with lithium ions, the temperature and humidity of the water-containing atmosphere is controlled, and the temperature of the water-containing atmosphere is in a range of 30° C. or more and 70° C. or less, and the relative humidity of the water-containing atmosphere is in a range of 50% or more and 80% or less.

2. The method for producing the active material for the nonaqueous secondary battery according to claim 1, wherein the material capable of being doped and dedoped with lithium ions is lithium nickel complex oxide, and the active material for the nonaqueous secondary battery is a positive electrode active material for the nonaqueous secondary battery.

3. The method for producing the active material for the nonaqueous secondary battery according to claim 1, wherein the material capable of being doped and dedoped with lithium ions has composition represented by a general formula $Li_xNi_{1-y}M_yO_2$ (wherein, x and y are $0.9 \leq x \leq 1.2$ and $0 \leq y \leq 0.5$ respectively, and M is at least one element selected from among B, Al, Ga, In, Si, Ge, Sn, Mg and transition metal elements).

4. The method for producing the active material for the nonaqueous secondary battery according to claim 3, wherein M is at least one element selected from among B, Al, Mg, Co, Cr, Mn and Fe.

5. The method for producing the active material for the nonaqueous secondary battery according to claim 1, wherein the material capable of being doped and dedoped with lithium ions has composition represented by a general formula $Li_xNi_{1-z}M2_zO_2$ (wherein, x and z are $0.9 \leq x \leq 1.2$ and $0.3 \leq z \leq 0.9$ respectively, and M2 are at least two elements selected from among B, Al, Si, Sn, Mg, Mn, Fe and Co).

6. The method for producing the active material for the nonaqueous secondary battery according to claim 1, wherein the element A is at least one element selected from among B, Al, Mg, Co, Cr, Mn and Fe.

7. The method for producing the active material for the nonaqueous secondary battery according to claim 6, wherein the element A is Al.

8. The method for producing the active material for the nonaqueous secondary battery according to claim 1, wherein the compound containing the element A is oxide, hydroxide, oxyhydroxide, carbonate or a mixture thereof.

9. The method for producing the active material for the nonaqueous secondary battery according to claim 1, wherein a process for adhering the compound containing the element A to the particle surface of the material capable of being doped and dedoped with lithium ions is dry mixing.

10. The method for producing the active material for the nonaqueous secondary battery according to claim 1, wherein carbon dioxide gas is supplied while retaining the adherend in the water-containing atmosphere.

11. The method for producing the active material for the nonaqueous secondary battery according to claim 1, wherein atmosphere in firing the adherend after retaining the adherend in the water-containing atmosphere until the predetermined weight increasing rate is obtained is an oxygen concentration of 90% by volume or more.

12. The method for producing the active material for the nonaqueous secondary battery according to claim 1, wherein temperature in firing the adherend after retaining the adherend in the water-containing atmosphere until the predetermined weight increasing rate is obtained is 600° C. or more, and retention time therein is 30 minutes or more.

13. An active material for a nonaqueous secondary battery produced by the producing method according to claim 1.

14. The method for producing the active material for the nonaqueous secondary battery according to claim 1, wherein the adherend is produced by dry mixing.

* * * * *